(12) United States Patent
Kellner et al.

(10) Patent No.: US 12,221,165 B2
(45) Date of Patent: Feb. 11, 2025

(54) UNDERBODY PROTECTION PANEL AND MOTOR VEHICLE HAVING AN UNDERBODY PROTECTION PANEL

(71) Applicant: Dr. Ing. h.c. F. Porsche Aktiengesellschaft, Stuttgart (DE)

(72) Inventors: Philipp Kellner, Renningen-Malmsheim (DE); Christopher Volkmer, Niefern-Oeschelbronn (DE); Simon Friess, Kuchen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 5 days.

(21) Appl. No.: 18/163,890

(22) Filed: Feb. 3, 2023

(65) Prior Publication Data
US 2023/0249756 A1 Aug. 10, 2023

(30) Foreign Application Priority Data
Feb. 10, 2022 (DE) .................... 10 2022 103 155.1

(51) Int. Cl.
*B32B 3/02* (2006.01)
*B32B 5/18* (2006.01)
*B62D 25/20* (2006.01)

(52) U.S. Cl.
CPC ............ *B62D 25/2072* (2013.01); *B32B 3/02* (2013.01); *B32B 5/18* (2013.01); *B32B 2250/03* (2013.01);
(Continued)

(58) Field of Classification Search
CPC .. B32B 3/02; B32B 3/085; B32B 5/02; B32B 5/024; B32B 5/18; B32B 5/245; B32B 5/26; B32B 15/00; B32B 15/04; B32B 15/046; B32B 15/06; B32B 15/14; B32B 25/045; B32B 25/08; B32B 25/10; B32B 27/00; B32B 27/06; B32B 27/065; B32B 2250/03; B32B 2260/021; B32B 2260/046; B32B 2262/101; B32B 2262/106; B32B 2305/022; B32B 2307/536;
(Continued)

(56) References Cited

U.S. PATENT DOCUMENTS 7,879,424 B2   2/2011  Smith et al.
7,997,182 B1   8/2011  Cox
(Continued)

FOREIGN PATENT DOCUMENTS

CA   2788047 C    3/2015
CN   109747564 A  5/2019
(Continued)

*Primary Examiner* — Humera N. Sheikh
*Assistant Examiner* — Kevin C T Li
(74) *Attorney, Agent, or Firm* — LEYDIG, VOIT & MAYER, LTD.

(57) ABSTRACT

An underbody protection panel including a multi-layered panel structure with a first outer layer, a second outer layer, and at least one intermediate layer arranged between the first outer layer and the second outer layer is provided. The intermediate layer is configured as a compressible intermediate layer, and the mechanical properties of the compressible intermediate layer vary across the surface of the intermediate layer.

20 Claims, 3 Drawing Sheets

(52) U.S. Cl.
CPC ... *B32B 2305/022* (2013.01); *B32B 2307/536* (2013.01); *B32B 2307/72* (2013.01); *B32B 2605/00* (2013.01)

(58) Field of Classification Search
CPC ............ B32B 2307/72; B32B 2605/00; B32B 2605/08; B32B 2607/00; B60R 13/0861; B62D 25/2072
See application file for complete search history.

(56) References Cited

U.S. PATENT DOCUMENTS

| | | |
|---|---|---|
| 10,479,413 B1 | 11/2019 | Woods et al. |
| 10,864,946 B2 | 12/2020 | Yoshida et al. |
| 11,161,402 B2 | 11/2021 | McCarron et al. |
| 11,208,155 B2 | 12/2021 | Aitharaju et al. |
| 11,318,716 B2 | 5/2022 | Endres et al. |
| 2008/0224455 A1 | 9/2008 | Griebel et al. |
| 2010/0143661 A1 | 6/2010 | Warrick |
| 2011/0285171 A1 | 11/2011 | Caliskan et al. |
| 2012/0312615 A1 | 12/2012 | Rawlinson |
| 2021/0213021 A1* | 7/2021 | Brichta ................ A61K 31/529 |
| 2022/0212530 A1 | 7/2022 | Rausch et al. |

FOREIGN PATENT DOCUMENTS

| | | | |
|---|---|---|---|
| CN | 114072322 A | 2/2022 | |
| DE | 102011075012 A1 | 11/2011 | |
| DE | 102014015976 A1 | 5/2016 | |
| DE | 102019206646 A1 * | 11/2020 | ............... B60K 1/04 |
| DE | 102019135323 A1 * | 6/2021 | ......... B62D 25/2072 |
| DE | 102020131876 A1 | 7/2021 | |
| EP | 0670257 B1 | 4/1998 | |
| KR | 100776077 B1 | 11/2007 | |
| KR | 101484309 B1 | 1/2015 | |

\* cited by examiner

UNDERBODY PROTECTION PANEL AND MOTOR VEHICLE HAVING AN UNDERBODY PROTECTION PANEL

CROSS-REFERENCE TO PRIOR APPLICATION

This application claims benefit to German Patent Application No. DE 10 2022 103 155.1, filed on Feb. 10, 2022, which is hereby incorporated by reference herein.

FIELD

The invention relates to an underbody protection panel and a motor vehicle having an underbody protection panel.

BACKGROUND

Motor vehicles typically have an underbody that can be protected against the introduction of force from below by means of an underbody protection panel. Such motor vehicles are, for example, electric vehicles with a subfloor battery comprising such an underbody protection panel between the subfloor battery and the roadway in order to protect the subfloor battery from impacts on the underbody. It is well known that motor vehicles can encounter local elevations with their underbodies on rough terrain or even on the road, etc., so that an undesirable introduction of force into the underbody can occur locally. The underbody and elements or aggregates of the motor vehicle arranged above the underbody can be undesirably damaged, which is to be avoided.

For this reason, the aforementioned underbody protection panels have become known, for example, from DE 10 2019 206 646 A1. The underbody protection panel known in DE 10 2019 206 646 A1 is located directly below the subfloor battery. It is formed in three layers as a sandwich arrangement with a top covering layer arranged at the top, a bottom covering layer arranged at the bottom, and a layer arranged between them with foam filler as the filler material.

The foam filler forms a compressible intermediate layer, which is compressed locally at every point of the underbody protection panel in case of a local introduction of force, and, with a higher introduction of force, locally passes the force onto the subfloor battery arranged thereabove. This certainly also has the disadvantage that a local introduction of force into the subfloor battery can also occur in regions that are rather unsuitable for this purpose, because the local mechanical stability of the sub-floor battery is rather low in these regions.

SUMMARY

In an embodiment, the present disclosure provides an underbody protection panel comprising a multi-layered panel structure with a first outer layer, a second outer layer, and at least one intermediate layer arranged between the first outer layer and the second outer layer. The intermediate layer is configured as a compressible intermediate layer, and the mechanical properties of the compressible intermediate layer vary across the surface of the intermediate layer.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
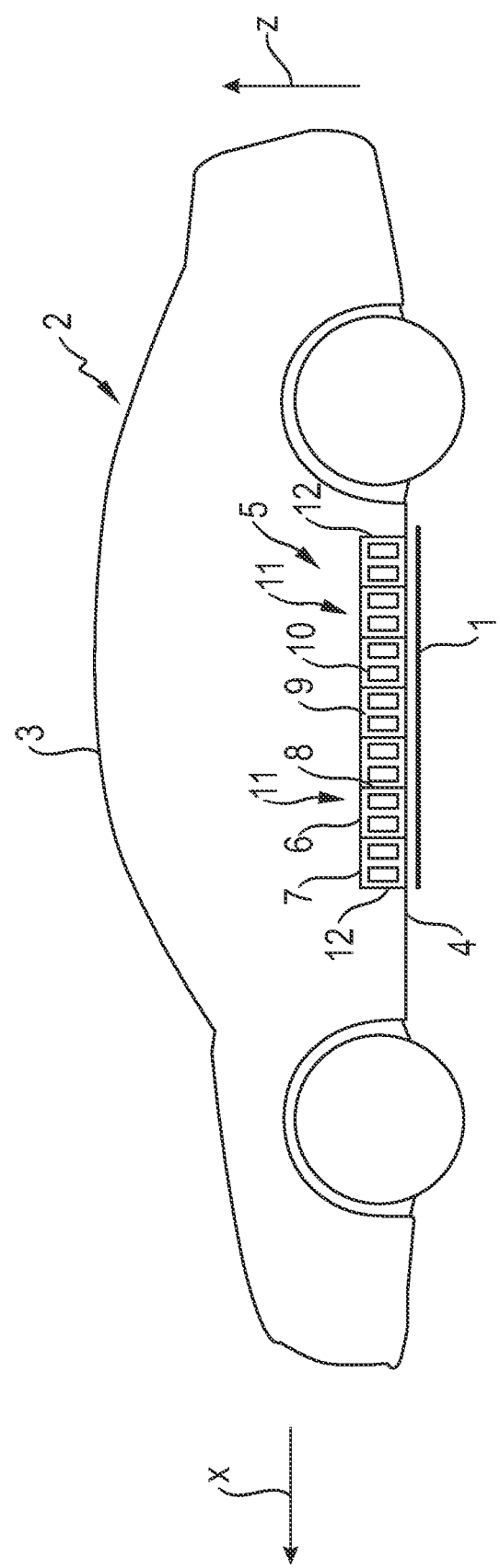
FIG. 1 illustrates a schematic illustration of an embodiment of a motor vehicle according to the invention having an underbody protection panel.

In an embodiment, the present invention provides an underbody protection panel that offers improved protection. Embodiments of the present invention also provides a motor vehicle with improved underbody protection.

An exemplary embodiment of the invention relates to an underbody protection panel having a multi-layered panel structure with a first outer layer, a second outer layer, and at least one intermediate layer arranged between the first layer and the second layer, wherein the intermediate layer is configured as a compressible intermediate layer, wherein the mechanical properties of the compressible intermediate layer vary across the surface of the intermediate layer. In doing so, it is achieved that the underbody protection panel has differently stable properties and differently damping properties distributed across the surface and, in some places, allows a better introduction of force on the structure above the underbody protection panel than in other locations. Thus, the introduction of force can be purposefully increased where the underbody is more stable due to its design, and the damping can be more strongly configured where the underbody is softer.

According to an advantageous embodiment, it is also expedient when the first layer and the second layer are configured so as to be substantially incompressible and consist of, for example, a substantially incompressible plastic material, a CFRP material, GRP material, and/or a metal layer. In this case, incompressible means that the two outer layers are significantly less compressible compared to the compressible intermediate layer, in particular at least by a factor of 10, 100, or more less compressible than the intermediate layer. This achieves a more even force distribution on the surface and a better permanent stability of the underbody protection panel.

In an embodiment, it is also expedient when the intermediate layer consists of at least one material whose mechanical properties vary across the surface of the intermediate layer, wherein the variation of the mechanical properties takes place incrementally or continuously. For example, the compression modulus, density, and/or foam hardness can vary across the surface in order to achieve the different mechanical properties. In this case, for example, continuous or incremental changes can be expedient. However, in particular, different materials can also be arranged so as to be distributed over the surface in order to distribute the different mechanical properties over the surface. In this case, for example, incremental changes can be expedient.

In an embodiment, it is also expedient when the intermediate layer consists of at least one material, such as in particular foam material, whose mechanical properties, such as in particular its density, foam hardness, compression modulus, and/or air content, varies across the surface of the intermediate layer, and/or the intermediate layer consists of several materials, such as in particular several foam materials, whose mechanical properties, such as in particular their density, foam hardness, compression modulus, and/or air content, vary and are arranged so as to be distributed across the surface of the intermediate layer in order to achieve the variation of the mechanical properties. For example, different elements with different foam materials can be arranged so as to be distributed in the surface in order to create and distribute the different mechanical properties in the surface.

It is also advantageous when the intermediate layer comprises at least one first region having first mechanical properties, at least one second region having second mechanical properties, and optionally at least one third region having third mechanical properties, wherein, in particular, the intermediate layer comprises several first regions having first mechanical properties, several second regions having second mechanical properties, and optionally several third regions having third mechanical properties. In doing so, a suitable modulation of the mechanical properties of the intermediate layer and thus also the underbody protection panel can be achieved.

An embodiment of the invention relates to a motor vehicle having a body and an underbody, wherein, in the region of the underbody, a mechanical structure is configured or arranged so as to have a regionally different pressure stability, for example a battery housing of a subfloor battery, wherein a underbody protection panel according to an embodiment of the present invention is arranged below the underbody. As a result, the mechanical design of the underbody protection panel can be adjusted to the modulation of the pressure stability of the underbody or its structure, which represents a significant improvement over the prior art.

In an embodiment, it is also expedient when regions of high pressure stability of the mechanical structure of the underbody are formed or caused by partitions, webs, or other reinforcements of the underbody, in particular of the battery housing, wherein regions of the mechanical structure of the underbody adjacent thereto are arranged or configured so as to have lower pressure stability. By designing the underbody with the battery housing having, for example, substantially vertical partitions, a locally high pressure stability of the underbody can be modulated, for example, in order to be able to arrange battery cells between the partitions. The regions of lower pressure stability can then be regions in which the battery cells are arranged. In such regions of lower pressure stability, preferably less force is introduced in the vertical direction than in the regions of the partitions with their high pressure stability.

It is also advantageous when the underbody protection panel is arranged and configured in such a way that the regions of the intermediate layer having more stable mechanical properties, such as in particular a higher compression modulus, are arranged below regions of higher pressure stability of the mechanical structure of the underbody, and the regions of the intermediate layer having less stable mechanical properties, such as in particular a lower compression modulus, are arranged below regions of lower pressure stability of the mechanical structure of the underbody, in particular adjacent to regions of higher pressure stability of the mechanical structure of the underbody. Thus, a targeted introduction of forces into the structure of the underbody takes place in regions of high pressure stability. This preserves regions of lower pressure stability.

It is also advantageous when the underbody protection panel is arranged and configured such that the mechanical properties of the intermediate layer decrease with increasing distance from regions of higher pressure stability of the mechanical structure of the underbody. A suitable distribution of the forces is thus achieved.

It is also advantageous when the underbody protection panel abuts the mechanical structure of the underbody at the regions of high pressure stability, in particular while interposing an abutment component between the mechanical structure and the underbody protection panel. The abutment causes a direct introduction of force, which is advantageous. The abutment component can be provided as a type of vibration damping element, which can securely prevent rattling when the underbody protection panel is constantly hitting the underbody during vibration of the underbody protection panel.

The invention is described in detail below using an exemplary embodiment with reference to the drawings.

In an embodiment, the invention relates to an underbody protection panel 1 and a motor vehicle 2 having such an underbody protection panel 1.

FIG. 1 shows a motor vehicle 2 having a body 3 and an underbody 4.

The motor vehicle 2 generally has a longitudinal direction x, a vertical direction z, and a transverse direction y. The longitudinal direction x is aligned in the direction of travel.

In the region of the underbody 4, a mechanical structure 5 is provided, which can be formed by the underbody 4 itself or by a component or aggregate that is arranged in the underbody 4. In the present embodiment example, a subfloor battery 6 is arranged in the underbody 4, which forms or represents the mechanical structure 5.

The subfloor battery 6 comprises a battery housing 7 with partitions 8, wherein battery cells 10 are arranged in individual housing chambers 9. The subfloor battery 6 can also be configured with a plurality of battery modules 11 arranged so as to be adjacent to one another.

Due to the partitions 8 or other structural elements of the battery housing 7, the underbody 4 with the subfloor battery 6 is configured with regionally varying pressure stability. In the region of the partitions 8 or perpendicular housing walls 12, the pressure stability in the perpendicular direction is particularly high, while, by contrast, between the partitions 8 and/or the perpendicular housing walls 12, the pressure stability is reduced, i.e. in particular in the region of the arrangement of the battery cells 10.

Below the underbody 4, an underbody protection panel 1 is arranged.

Figure 2:
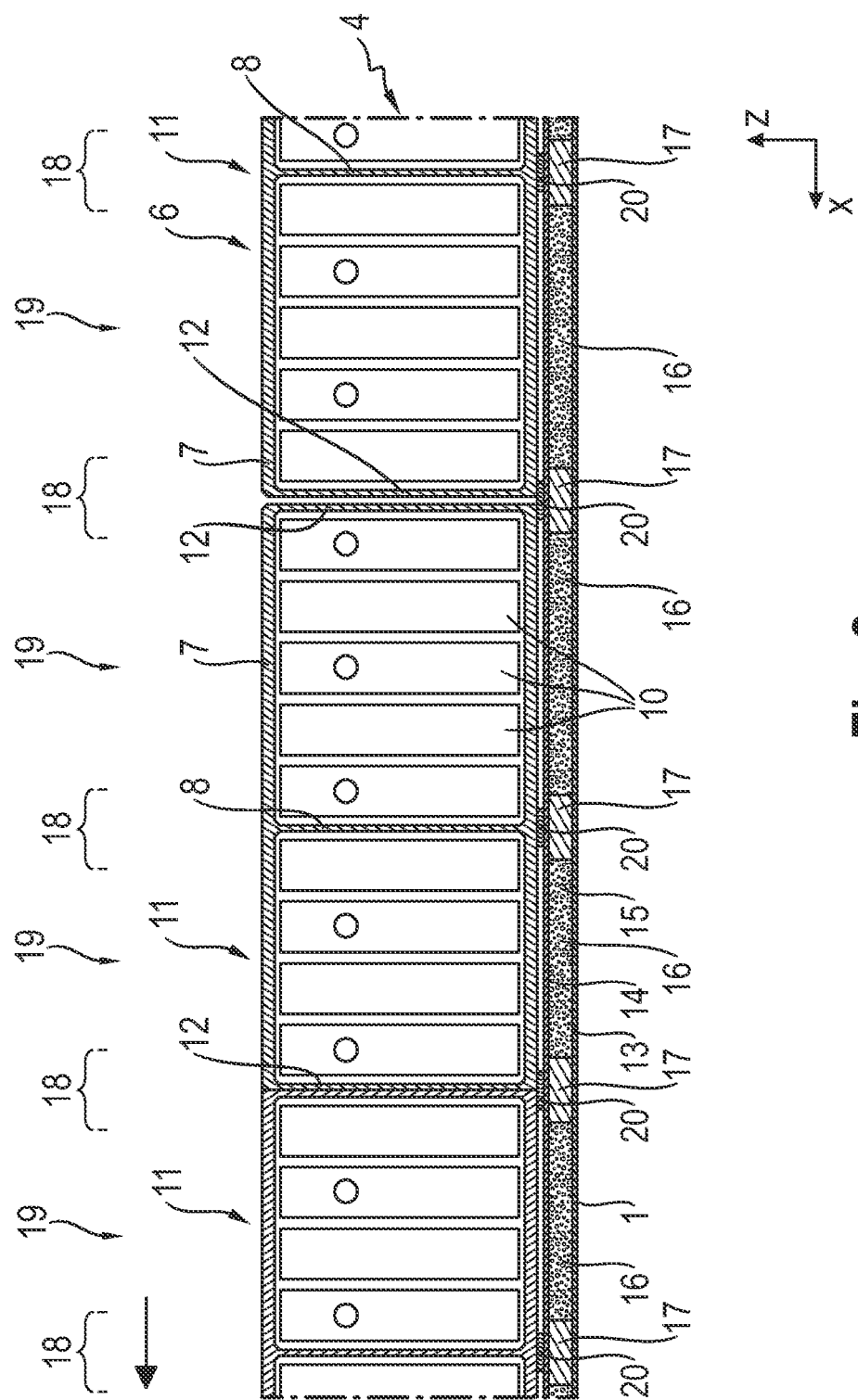
FIG. 2 illustrates a schematic cross-sectional diagram of a subfloor battery having an underbody protection panel according to an embodiment of the invention.

The underbody protection panel 1, see FIG. 2, has a multi-layer panel structure. The panel structure of the underbody protection panel 1 is at least three layers with a first outer layer 13, a second outer layer 14, and at least one intermediate layer 15 arranged between the first layer 13 and the second layer 14.

For example, the first layer 13 and the second layer 14 are thinner than the intermediate layer 15.

In one example, the first layer 13 and the second layer 14 are level. They can be modulated individually or together, but also with respect to their surface in terms of heights and depths.

For example, the first layer 13 and the second layer 14 are substantially incompressible. For example, they consist of a substantially incompressible plastic material, a CFRP material, GRP material, and/or a metal layer.

The intermediate layer 15 is configured as a compressible intermediate layer 15. The mechanical properties of the compressible intermediate layer 15 vary across the surface of the intermediate layer 15. This means that the compressible intermediate layer 15 has a variation of the compressible properties across the surface.

The intermediate layer 15 consists of at least one material whose mechanical compressible properties vary across the surface of the intermediate layer 15, wherein the variation of the mechanical compressible properties takes place incrementally or continuously. It is also possible for the intermediate layer 15 to consist of several materials, in particular two, three, or more materials having different mechanical compressible properties.

According to an embodiment, the intermediate layer 15 consists of at least one material, such as a foam material, whose mechanical properties, such as in particular its density, foam hardness, compression modulus, and/or air content, varies across the surface of the intermediate layer, and/or the intermediate layer 15 consists of several materials, such as in particular several foam materials, whose mechanical properties, such as in particular their density, foam hardness, compression modulus, and/or air content, vary or are different and are arranged so as to be distributed across the surface of the intermediate layer 15 in order to achieve the variation of the mechanical properties.

Figure 3:
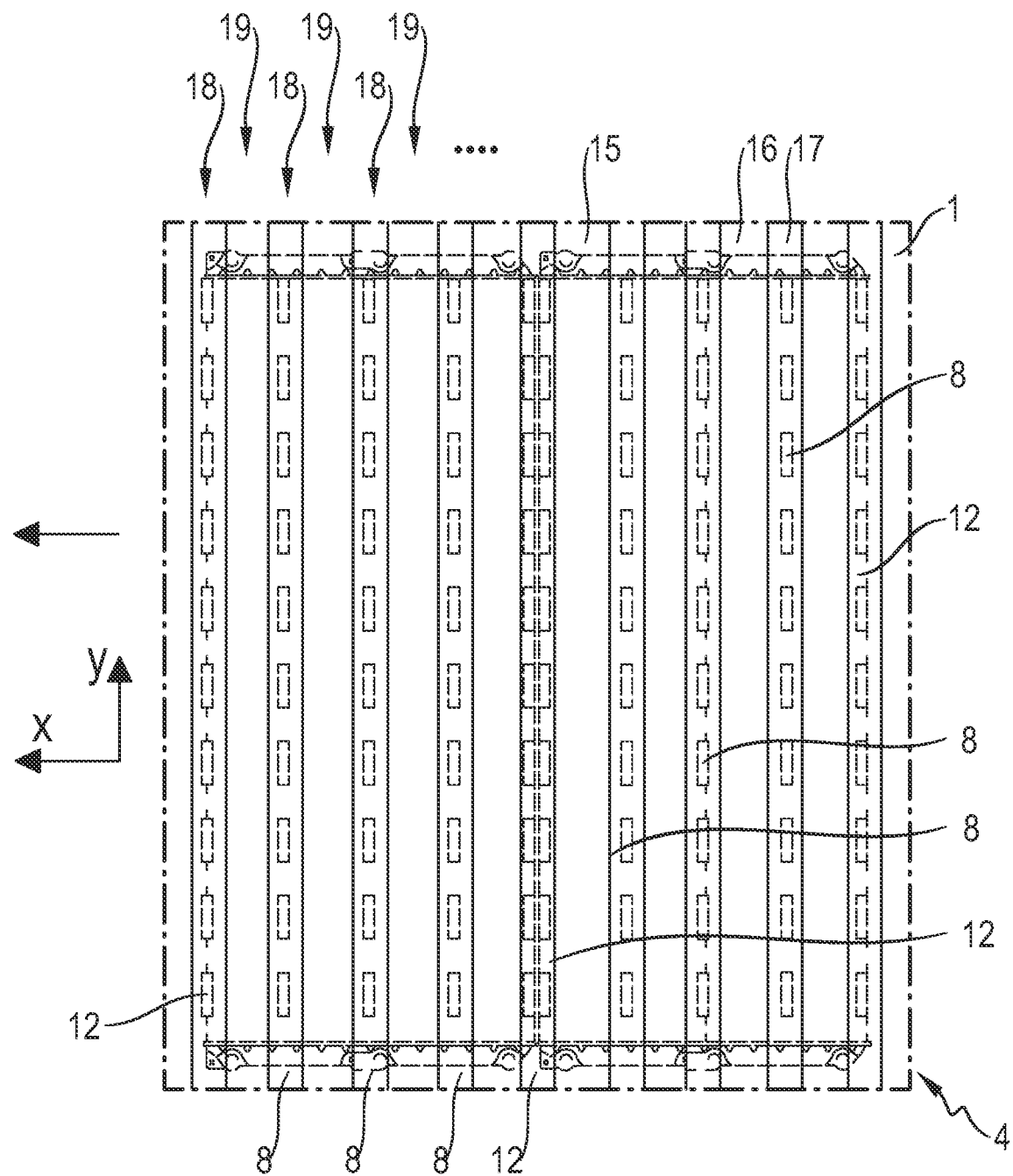
FIG. 3 illustrates a schematic view of the underbody protection panel having a schematically suggested structure of the housing of the subfloor battery.

FIGS. 2 and 3 show examples in which the intermediate layer 15 comprises at least a first region 16 having first mechanical properties and at least a second region 17 having second mechanical properties. Optionally, the intermediate layer 15 can also have at least one third region having third mechanical properties.

Advantageously, the intermediate layer 15 according to FIGS. 2 and 3 comprises several first regions 16 having first mechanical properties and several second regions 17 having second mechanical properties, wherein several third regions having third mechanical properties can optionally also be provided.

In FIGS. 2 and 3, several first regions 16 and several second regions 17 are provided, which are strip-shaped and are arranged alternately adjacent to one another.

FIGS. 2 and 3 show that the underbody 4 is configured so as to have different levels of pressure stability in some regions due to the partitions 8 or other structural elements of the battery housing 7, see the housing walls 12. In the region of the partitions 8 or perpendicular housing walls 12, the pressure stability in the perpendicular direction is particularly high, while, by contrast, between the partitions 8 and/or the perpendicular housing walls 12, the pressure stability is reduced, i.e. in particular in the region of the arrangement of the battery cells 10. In the x-direction, the regions of high pressure stability 18 alternate with regions of low pressure stability 19. Accordingly, in principle, regions of high pressure stability 18 of the mechanical structure of the underbody 4 are formed or caused by partitions 8, webs, or other reinforcements of the underbody 4, in particular of the battery housing 7, wherein regions of the mechanical structure of the underbody 4 adjacent thereto are arranged or configured so as to have lower pressure stability 19.

The underbody protection panel 1 is arranged and configured in such a way that the regions 17 of the intermediate layer 15 having more stable mechanical properties, such as in particular a higher compression modulus, are arranged below regions of higher pressure stability 18 of the mechanical structure of the underbody 4, and the regions 16 of the intermediate layer 15 having less stable mechanical properties, such as in particular a lower compression modulus, are arranged below regions of lower pressure stability 19 of the mechanical structure of the underbody 4, in particular adjacent to regions of higher pressure stability 18 of the mechanical structure of the underbody, as shown in FIGS. 2 and 3.

The strips having higher mechanical properties 17 of the underbody protection panel 1 are arranged below the regions 18 of high pressure stability of the underbody 4 and the strips having lower mechanical properties 16 of the underbody protection panel 1 are arranged below the regions 19 of lower pressure stability of the underbody 4.

The underbody protection panel 1 can also be arranged and configured such that the mechanical properties of the intermediate layer 15 decrease with increasing lateral distance from regions 18 of higher pressure stability of the mechanical structure of the underbody 4. This decrease can be incremental or continuous.

According to FIG. 2, it can also be seen that the underbody protection panel 1 abuts the mechanical structure of the underbody 4 at the regions of high pressure stability 18. This abutment can be direct or it can also be carried out with the interposition of an abutment component 20 between the mechanical structure of the underbody 4 and the underbody protection panel 1. For example, a non-woven material, foam material, or rubber material can be provided as the abutment component 20, for example a corresponding mat, etc.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Underbody protection panel
2 Motor vehicle
3 Body
4 Underbody
5 Mechanical structure
6 Subfloor battery
7 Battery housing
8 Partitions
9 Housing chamber 10 Battery cell
11 Battery module
12 Housing walls
13 First outer layer
14 Second outer layer
15 Intermediate layer
16 First region/region having less stable mechanical properties
17 Second region/region having more stable mechanical properties
18 High pressure stability
19 Low pressure stability
20 Abutment component

The invention claimed is:

1. An underbody protection panel comprising:
a multi-layered panel structure with a first outer layer;
a second outer layer; and
at least one intermediate layer arranged between the first outer layer and the second outer layer, wherein the intermediate layer is configured as a compressible intermediate layer, and wherein the mechanical properties of the compressible intermediate layer vary across the surface of the intermediate layer.

2. The underbody protection panel according to claim 1, wherein the first outer layer and the second outer layer are configured so as to be substantially incompressible and consist of one or more of a substantially incompressible plastic material, a CFRP material, GRP material, and a metal layer.

3. The underbody protection panel according to claim 1, wherein the intermediate layer consists of at least one material whose mechanical properties vary across the surface of the intermediate layer, and wherein the variation of the mechanical properties takes place incrementally or continuously.

4. The underbody protection panel according to claim 3, wherein the intermediate layer comprises at least one material whose mechanical properties varies across the surface of the intermediate layer, and/or the intermediate layer comprises several materials whose mechanical properties vary and are arranged so as to be distributed across the surface of the intermediate layer in order to achieve the variation of the mechanical properties.

5. The underbody protection panel according to claim 1, wherein the intermediate layer comprises at least one first region having first mechanical properties, at least one second region having second mechanical properties.

6. A motor vehicle having a body and an underbody, wherein, in a region of the underbody, a mechanical structure is configured or arranged so as to have a regionally different pressure stability, and wherein an underbody protection panel according to claim 1 is arranged below the underbody.

7. The motor vehicle according to claim 6, wherein regions of high pressure stability of the mechanical structure of the underbody are formed or caused by partitions, webs, or other reinforcements of the underbody, and wherein regions of the mechanical structure of the underbody adjacent thereto are arranged or configured so as to have lower pressure stability.

8. The motor vehicle according to claim 6, wherein the underbody protection panel is arranged and configured in such a way that regions of the intermediate layer having more stable mechanical properties are arranged below regions of higher pressure stability of the mechanical structure of the underbody, and regions of the intermediate layer having less stable mechanical properties are arranged below regions of lower pressure stability of the mechanical structure of the underbody.

9. The motor vehicle according to claim 8, wherein the underbody protection panel is arranged and configured such that the mechanical properties of the intermediate layer decrease with increasing distance from regions of higher pressure stability of the mechanical structure of the underbody.

10. A motor vehicle, the motor vehicle comprising:
a body;
an underbody; and
an underbody protection panel, the underbody protection panel comprising:
a multi-layered panel structure with a first outer layer:
a second outer layer; and
at least one intermediate layer arranged between the first outer layer and the second outer layer,
wherein the intermediate layer is configured as a compressible intermediate layer,
wherein mechanical properties of the compressible intermediate layer vary across the surface of the intermediate layer,
wherein, in a region of the underbody, a mechanical structure is configured or arranged so as to have a regionally different pressure stability,
wherein the motor vehicle has a longitudinal extent extending in a longitudinal direction, a vertical extent extending in a vertical direction, and a transverse extent extending in a transverse direction, the longitudinal direction being aligned with a direction of travel,
wherein the underbody is arranged below the body in the vertical direction,
wherein the underbody protection panel is arranged below the underbody in the vertical direction,
wherein the underbody protection panel abuts the mechanical structure of the underbody at regions of high pressure stability,
wherein the underbody protection panel is arranged and configured in such a way that regions of the intermediate layer having more stable mechanical properties are arranged directly, vertically below regions of higher pressure stability of the mechanical structure of the underbody, and regions of the intermediate layer having less stable mechanical properties are arranged directly, vertically below regions of lower pressure stability of the mechanical structure of the underbody.

11. The underbody protection panel according to claim 4, wherein the at least one material of the intermediate layer and/or the several materials of the intermediate layer include a foam material.

12. The underbody protection panel according to claim 4, wherein the varying mechanical properties include at least one of density, foam hardness, compression modulus, and air content.

13. The underbody protection panel according to claim 5, wherein the intermediate layer further comprises at least one third region having third mechanical properties.

14. The underbody protection panel according to claim 5, wherein the intermediate layer comprises several first regions having first mechanical properties and several second regions having second mechanical properties.

15. The underbody protection panel according to claim 14, wherein the intermediate layer further comprises at least one third region having third mechanical properties.

16. The underbody protection panel according to claim 15, wherein the intermediate layer further comprises several third regions having third mechanical properties.

17. The motor vehicle according to claim 6, wherein the mechanical structure is a subfloor battery.

18. The motor vehicle according to claim 17, wherein the regions of high pressure stability of the mechanical structure of the underbody are formed or caused by partitions, webs, or other reinforcements of a battery housing of the subfloor battery.

19. The motor vehicle according to claim 8, wherein the mechanical properties include at least a compression modulus and wherein the regions of the intermediate layer having less stable mechanical properties are arranged adjacent to the regions of higher pressure stability of the mechanical structure of the underbody.

20. The motor vehicle according to claim 10, wherein an abutment component is interposed between the mechanical structure and the underbody protection panel.

* * * * *